(12) United States Patent
Chen et al.

(10) Patent No.: US 7,376,303 B2
(45) Date of Patent: May 20, 2008

(54) OPTICAL COUPLING ASSEMBLY

(75) Inventors: Chien-Hua Chen, Corvallis, OR (US); Kuohua Wu, Tucson, AZ (US); Jeffrey S. Obert, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/490,388

(22) Filed: Jul. 20, 2006

(65) Prior Publication Data

US 2008/0019653 A1    Jan. 24, 2008

(51) Int. Cl.
G02B 6/42    (2006.01)
G02B 6/12    (2006.01)

(52) U.S. Cl. .......................................... 385/31; 385/14
(58) Field of Classification Search ................ 385/31, 385/14
See application file for complete search history.

(56) References Cited

U.S. PATENT DOCUMENTS

| | | | |
|---|---|---|---|
| 4,049,414 A | 9/1977 | Smith | |
| 6,180,496 B1 | 1/2001 | Farrens et al. | |
| 6,521,858 B1 | 2/2003 | Barnett | |
| 6,563,133 B1 | 5/2003 | Tong | |
| 6,884,696 B2 | 4/2005 | Aga et al. | |
| 6,908,832 B2 | 6/2005 | Farrens et al. | |
| 7,128,875 B2 * | 10/2006 | Cubicciotti | 422/82.05 |
| 2003/0192793 A1 | 10/2003 | Li | |
| 2004/0086423 A1 * | 5/2004 | Wohlstadter et al. | 422/52 |
| 2004/0126077 A1 | 7/2004 | Strobl et al. | |
| 2004/0245085 A1 * | 12/2004 | Srinivasan | 204/157.15 |
| 2005/0023656 A1 * | 2/2005 | Leedy | 257/678 |
| 2005/0059178 A1 * | 3/2005 | Erchak et al. | 438/22 |
| 2005/0059179 A1 * | 3/2005 | Erchak et al. | 438/22 |
| 2005/0123451 A1 * | 6/2005 | Nomura | 422/82.11 |
| 2005/0224155 A1 | 10/2005 | Chen et al. | |
| 2006/0043391 A1 * | 3/2006 | Erchak et al. | 257/82 |
| 2006/0043400 A1 * | 3/2006 | Erchak et al. | 257/98 |
| 2007/0045640 A1 * | 3/2007 | Erchak et al. | 257/98 |

OTHER PUBLICATIONS

AFOSR, Fabrication Techniques for Integrated-Optical Grating-Based Devices.

* cited by examiner

*Primary Examiner*—Kianni C Kaveh

(57) ABSTRACT

An optical coupling assembly includes light transmitting or reflecting members fusion bonded to one another.

6 Claims, 4 Drawing Sheets

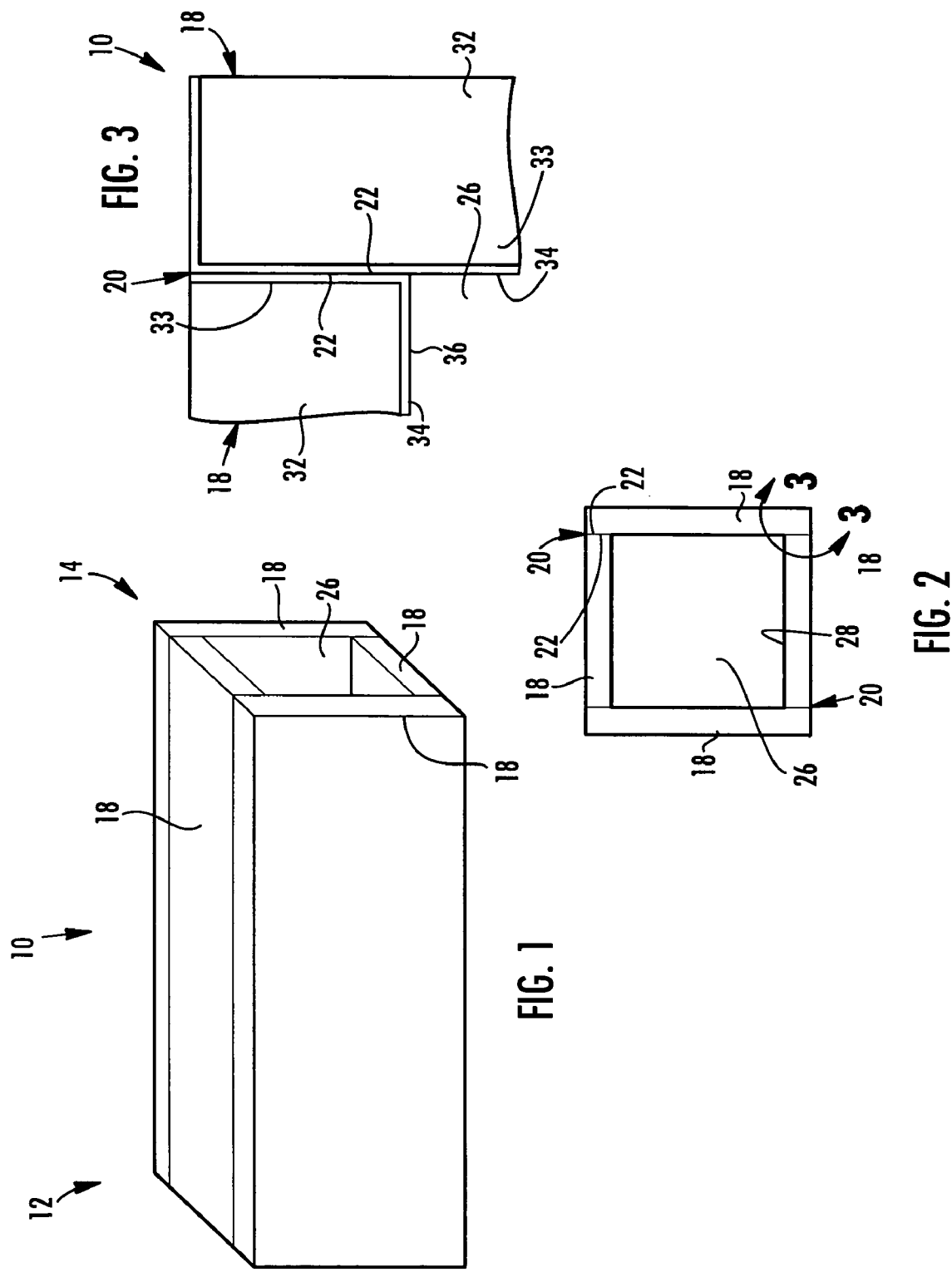

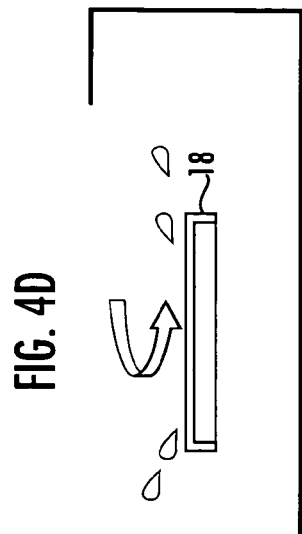
FIG. 4A
FIG. 4B
FIG. 4C
FIG. 4D
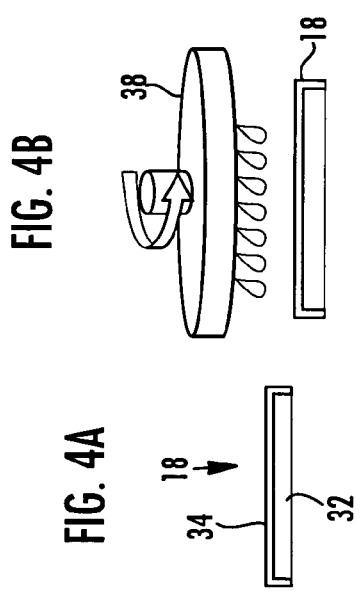
FIG. 4E
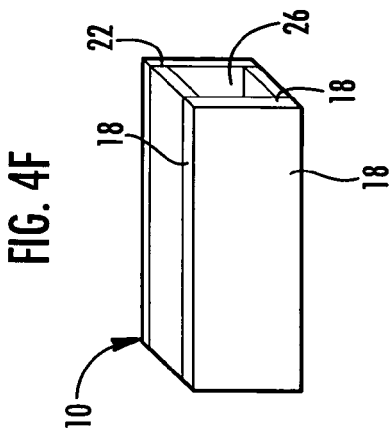
FIG. 4F
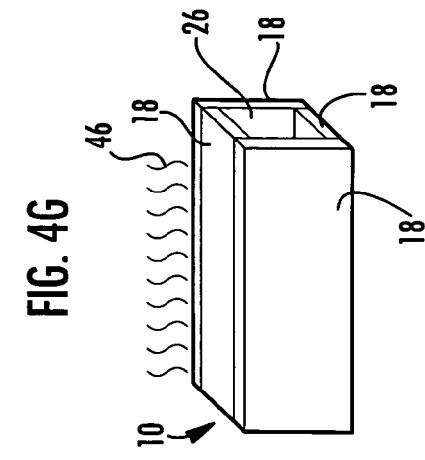
FIG. 4G

OPTICAL COUPLING ASSEMBLY

BACKGROUND

Optical coupling assemblies couple light between optical components by transmitting or reflecting such light. Optical coupling assemblies may have seams between assembled members that leak light or that degrade from prolonged exposure to such light.

BRIEF DESCRIPTION OF THE DRAWINGS

FIG. 1 is a top perspective of an optical coupling assembly according to an example embodiment.

FIG. 2 is a right end elevational view of the optical coupling assembly of FIG. 1 according to an example embodiment.

FIG. 3 is an enlarged fragmentary view of the optical coupling assembly of FIG. 2 taken along line 3-3 according to an example embodiment.

FIGS. 4A-4G are schematic illustrations of a method for forming the optical coupling assembly of FIG. 1 according to an example embodiment.

DETAILED DESCRIPTION OF THE EXAMPLE EMBODIMENTS

Figure 5C:
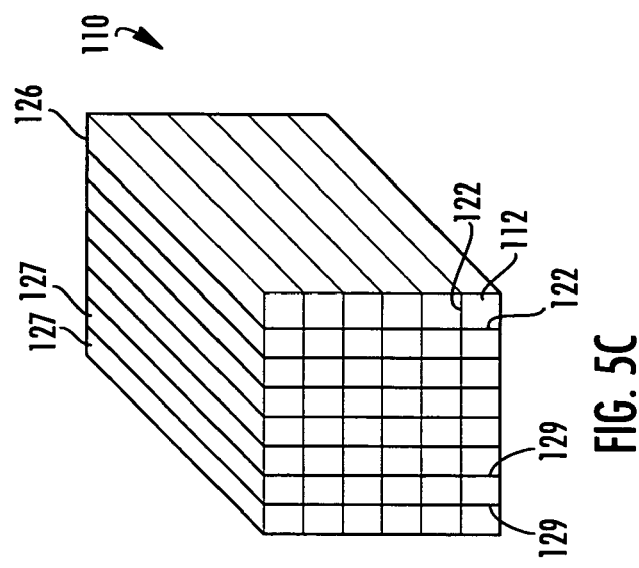
FIGS. 5A-5C are schematic illustrations of a method for forming another embodiment of the optical coupling assembly of FIG. 1 according to an example embodiment.

FIGS. 1-3 illustrate optical coupling assembly 10 according to one example embodiment. Optical coupling assembly 10 is configured to couple light between optical components. In other words, optical coupling assembly 10 is configured to transmit light between optical components. In the particular example illustrated, optical coupling assembly 10 is additionally configured to modify characteristics of the light that is being transmitted. For example, optical coupling assembly 10 is configured to homogenize light while the light is being transmitted from a first end 12 to a second end 14. As will be described in more detail, optical coupling assembly 10 transmits such light with less leakage of light and may be less susceptible to degradation from prolonged exposures to the light being transmitted.

Optical coupling assembly 10 comprises a light pipe homogenizer. Optical coupling assembly 10 includes at least three side wall members 18 joined to one another along seams 20 in which opposite faces or interfaces 22 of members 18 meet and are joined to one another to form a hollow interior or light passage 26 through which light is transmitted and homogenized. Each sidewall member 18 includes an interior facing reflective surface 28 configured to reflect light being transmitted. In one embodiment, surfaces 28 may comprise highly polished surfaces coated with highly reflective materials. In one embodiment, members 18 may comprise glass or other supporting material having at least surfaces 28 coated with a reflective metal oxide material such as UV enhanced Aluminum coating or one or more layers of dielectric material such as quarter wavelength alternating SiO2/HfO2 layers which have a sufficiently high refractive index to substantially reflect light.

FIG. 3 illustrates one of seams 20 in more detail. As shown by FIG. 3, interfaces 22 are fusion bonded to one another. In particular, interfaces 22 have bonding surface energy (or bonding site densities) which are increased to enhance fusion bonding. In one embodiment, the increasing of bonding surface energy along interfaces 22 is achieved by plasma treating interfaces 22. Plasma treatment facilitates low-cost fusion bonding of side wall members 18. Such plasma treatment may utilize oxygen, nitrogen or argon plasma, for example. In yet another embodiment, the bonding surface energy may be increased by other techniques such as ion beam sputtering processes, reactive ion etching, the striking of plasma onto interfaces 22, by ion implantation or ion bombardment.

In contrast to optical coupling assemblies in which members are joined by optical epoxy or other similar adhesives, seams 20 may be less prone to light leakage and may be less susceptible to degradation from prolonged exposure to light such as ultraviolet light. Because interfaces 22 are fusion bonded, interfaces 22 are in direct contact on atomic level, reducing or eliminating any gap between interfaces 22. As a result, less light between interfaces 22 is leaked and the light transmitting efficiency of assembly 10 is enhanced. Moreover, because interfaces 22 are fusion bonded to one another on an atomic level, and do not rely on optical epoxy which is susceptible to degradation over time from prolonged exposure to ultraviolet light, the joining of interfaces 22 is more robust over time.

FIG. 3 further illustrates two of sidewall members 18 in more detail. As shown by FIG. 3, each member 18 includes a substrate 32 and a reflective layer 34. Substrate 32 comprises one or more layers of one or more materials configured to support reflective layer 34. In one embodiment, substrate 32 comprises a material that may be polished, enhancing the surface of layer 34 which is coated upon substrate 32. In one embodiment, substrate 32 comprises glass. In other embodiments, substrate 32 may comprise other materials.

Reflective layer 34 comprises one or more layers of one or more materials having a relatively high reflective index so as to reflect light. In the particular example illustrated, reflective layer 34 has an exterior most surface 36 formed of an appropriate material and having an appropriate smoothness to facilitate fusion bonding. In one embodiment, layer 34 comprises a layer of deposited SiO2 polished to a smoothness in the order of angstroms-level flatness. As shown by FIG. 3, layers 34 of adjacent members 18 form interfaces 22 which are fusion bonded to one another along seams 20. Because layers 34 also provide interfaces 22 for fusion bonding side wall members 18, fabrication and the fusion bonding of side wall members 18 may be less complex. In other embodiments, layers 34 of side wall members 18 may be formed from other materials which are not adapted for fusion bonding, wherein interfaces 22 omits layers 34 or include one or more layers of other materials adapted fusion bonding Although FIG. 3 illustrates interfaces 22 as being formed by layers 34 deposited upon both faces 33 of side wall members 18, in other embodiments, one of faces 33 may omit layer 34 with face 33 itself being polished. In yet other embodiments, both faces 33 of side wall members 18 may omit layer 34, wherein both faces 33 are polished or otherwise made sufficiently smooth for desired levels of fusion bonding along interfaces 22.

Although FIGS. 1-3 illustrate optical coupling assembly 10 as comprising a light pipe homogenizer having a generally square cross-section, in other embodiments, optical coupling assembly 10 may comprise a light pipe homogenizer having other cross sections. For example, in other embodiments, the light pipe homogenizer may have greater than the four sides.

FIGS. 4A-4G schematically illustrate one example method for forming optical coupling assembly 10 shown in FIGS. 1-3. FIG. 4A illustrates forming of one of side wall members 18. As shown by FIG. 4A, one of side wall members 18 is formed or otherwise provided. In one embodiment, sidewall member 18 may be formed by providing substrate 32, polishing surface 40 of substrate 32 and depositing layer 34 upon substrate 32.

As shown by FIG. 4B, at least those portions of layer 34 that serve as interfaces 22 (shown in FIG. 3) are polished or otherwise made smooth. In the example illustrated, the entirety of layer 34 is polished. Layer 34 is polished to angstroms-level flatness. In one embodiment, layer 34 is polished via chemical-mechanical polishing (CMP) arrangement 38. In other embodiment, polishing to be formed using other methods.

As shown by FIGS. 4C and 4D, polished surfaces of layer 34 are cleaned. In one embodiment, layer 34 undergo cleaning with Standard Clean 1 (SC1) by such an arrangement 40 followed by spinning and/or rinsing and/or drying as illustrated in FIG. 4D. In other embodiments, such cleaning may be alternatively performed using a wet treatment with deionized water. In yet other embodiments, such cleaning may be performed using other methods or may be omitted.

As shown by FIG. 4E, the bonding surface energy of at least those portions of sidewall member 18 that serve as interfaces 22 is increased. In the example illustrated in FIG. 4E, one or more of such side wall members 18 are plasma treated. In the example illustrated, one or more of side wall members 18 are placed within a plasma chamber 42 containing an appropriate gas 44 such as oxygen, nitrogen or argon, wherein radiofrequency (RF) power is applied. In other embodiments, the bonding site density is increased using other methods such as ion beam sputtering, reactive ion etching, plasma striking, ion implantation or ion bombardment.

Following such plasma treatment, at least those portions of sidewall member 18 serving as interfaces 22 may further be treated by being dipped in deionized water or SC1 chemistry. In one embodiment, side wall members 18 may be dipped for a time of about 30 sec to increase silanol group (Si—OH) density of such surfaces. After dipping, the surfaces may once again be dried using, for example, a spin-rinse dryer. In some embodiments, the dipping of side wall members 18 in deionized water or treating with a SC1 chemistry may be omitted.

This process is repeated for each of side wall members 18. As shown by FIG. 4F, each of side wall members 18 are then joined to one another along interfaces 22, whereby side wall members 18 are fusion bonded to one another. To enhance bonding, a compression force may be applied to side wall members 18. Because those portions of layer 34 along interface 22 have increased bonding surface energy, such fusion bonding may be achieved at much lower temperatures. According to one embodiment, such fusion bonding may be achieved at a temperature of less than or equal to about 200° Celsius. In one embodiment, fusion bonding may be achieved at substantially room temperature (temperatures ranging between approximately 15° C. and approximately 40° C.). Substantial bond strength may be achieved in approximately 24 hours when fusion bonding is performed at room temperature.

As shown by FIG. 4G, in lieu of performing fusion bonding at room temperature, side wall members 18 are annealed with applied heat 46 at a temperature of approximately 200° C. for approximately 2 hours. Such annealing reduces time for achieving substantial bonding strength along interfaces 22. In other embodiments, annealing may be performed at other temperatures and for other periods of time.

FIG. 5C illustrates optical coupling assembly 110, another embodiment of optical coupling assembly 10 shown in FIG. 1. Optical coupling assembly 110 comprises a multi-element light pipe homogenizer configured to homogenize light from multiple light sources such as an array of light emitting diodes. Optical coupling assembly 110 includes multiple individual light pipes or rod members 112 joined to one another by fusion bonding. As shown by FIG. 5C, each rod member 112 has at least two faces 122 fusion bonded to faces 122 of adjacent rod members 112. In particular, corner rod members 112 have two faces 122 fusion bonded to adjacent rod members 112, side rod members 112 have three faces 122 fusion bonded to adjacent rod members 112 and middle rod members 112 have four sides fusion bonded to faces 122 of adjacent rod members 112. Because such faces 122 are fusion bonded to one another, the joining of rod members 112 is less susceptible to degradation upon prolonged exposure to light, such as ultraviolet light.

Figure 5B:
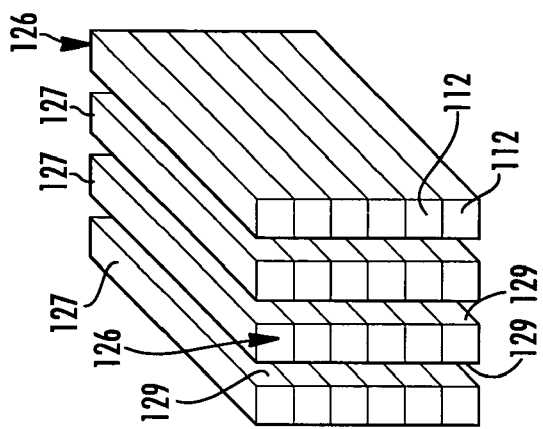
Figure 5A:
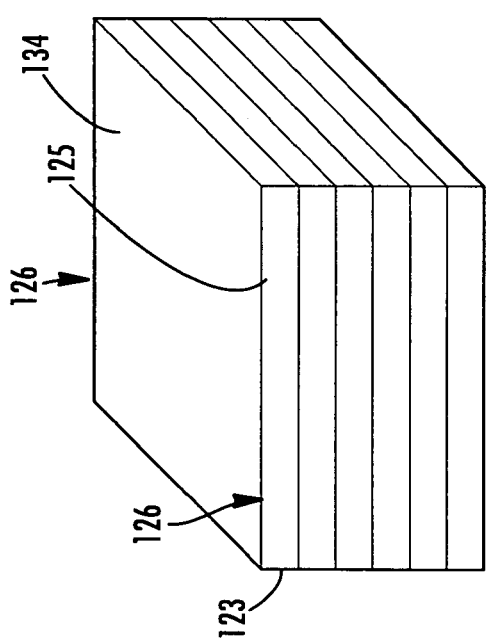

FIGS. 5A-5C schematically illustrate one example method for forming optical coupling assembly 110 As shown by FIG. 5A, optical plates 123 are fusion bonded to one another. Each plate 123 includes sheets 125 and layer 134. Sheet 125 includes one or more layers of one or more transparent materials configured to support layer 134 and further configured to be polished or made sufficiently smooth such at layer 134 is also sufficiently smooth a large planar substrate sheet 125 having polished exterior top, bottom and side surfaces which have been coated with a reflective layer 134. Ends 126 are not coated with layer 134. In one embodiment, sheet 125 may be formed from glass. In other embodiments, sheet 125 may be formed from other materials.

Layer 134 comprises one or more layers of one or more materials which, together, have a high index of refraction, enabling layer 134 to substantially reflect light (as described with respect to optical coupling assembly 10). In one embodiment, layer 134 may be formed from $SiO_2$. In other embodiments, layer 134 may be formed from other materials.

To fusion bond plates 123 together, the bonding surface energy along opposites faces of plates 123 is increased, facilitating fusion bonding of plates 123 at lower temperatures. According to one embodiment, the bonding surface energy along opposing faces of plates 123 is increased by plasma treatment. For example, in one embodiment, optical plates 123 are fusion bonded to one another by substantially the same process described above with respect to the fusion bonding of side wall members 18 of optical coupling assembly 10 as illustrated and described with respect to FIGS. 4B-4G.

As shown by FIG. 5B, the fusion bonded stack of plates 123 is cut or otherwise severed into multiple stacks 127 of fusion bonded rod members 112. In one embodiment, plates 123 may be severed by sawing. In other embodiments, plate 123 may be severed in other fashions.

Upon the severing of plates 123 into multiple stacks 127, the sides 129 of such stacks where such severing occurred are further polished. After polishing, the polished side surfaces are coated with layer 134. As a result, each stack 127 includes multiple individual rod members 112 of solid transparent material coated with a reflective layer 134 on all exterior surfaces except for ends 126.

As shown by FIG. 5C, the individual stacks 127 are fusion bonded to one another along their sides to form optical coupling assembly 110. In particular, the bonding surface energy of each of sides 129 is increased to facilitate fusion bonding of such sides 129 to one another. In one embodiment, plasma treatment is used to increase the bonding surface energy of each of sides 129. According to one embodiment, sides 129 are plasma treated and joined to one another in a fashion substantially similar to the fashion in which side wall members 18 of optical coupling assembly 110 are joined to one another as described with respect to FIGS. 4B-4G. In other embodiments, the bonding surface energy of sides 129 prior to fusion bonding may be increased in other fashions.

Figure 6:
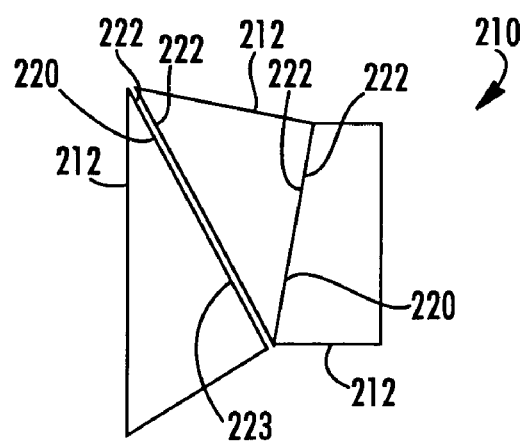
FIG. 6 is a sectional view of another embodiment of the optical coupling assembly of FIG. 1 according to an example embodiment.

FIG. 6 is a sectional view of optical coupling assembly 210, another embodiment of optical coupling assembly 10. Optical coupling assembly 210 is a dichroic prism including multiple prism members 212 fusion bonded to one another. Each prism member 212 is a mass of one or more transparent materials have a selected refractive index so as to transmit or reflect selected ranges of wavelengths of light. Each member 212 includes an interface 222 having increased bonding surface energy to facilitate fusion bonding. In the example embodiment illustrated, each interface 222 is provided with one or more layers 223 of one or more bonding interface materials deposited upon member 212. The bonding interface material forming layer 223 comprises a material having controlled material characteristics facilitating polishing of the material. Because layers 223 may facilitate enhanced polishing or smoothness of interfaces 222, fusion bonding of interfaces 222 may also be enhanced. Examples of fusion bonding materials include TEOS, amorphous silicon, phosphosilicate glass (PSG), silicon nitride or glass frit. Layer 223 may be deposited by methods, including, but not limited to, sputtering, chemical vapor deposition (CVD) or screen print. Layer 223 is relatively thin, having a thickness of between tens of angstroms and tenths of a micron. In one embodiment, layer 223 is subsequently polished to an angstroms-level flatness via chemical-mechanical polishing (CMP).

In other embodiments, members 212 may omit layers 223. In such an alternative embodiment, opposing surfaces of each member 212 may be polished and treated so as to increase the bonding surface energy of such surfaces. For example, such opposing surfaces of members 212 may be plasma treated and then fusion bonded to one another.

Because members 212 are fusion bonded to one another rather than joined to one another by an adhesive such as an optical epoxy, members 212 are more robustly connected to one another. In particular, members 212 are less likely to separate after prolonged exposure to light, such as ultraviolet light. Moreover, because interfaces 222 are joined on an atomic level, less like may be leaked along seams to 220 by members 212 and optical coupling assembly 210, increasing the light transmitting efficiency of assembly 210.

Figure 7:
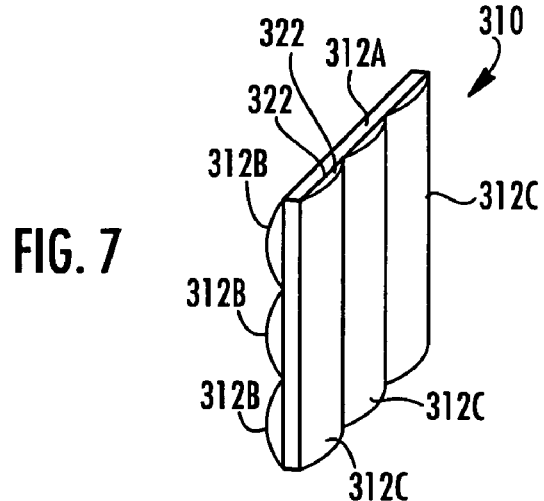
FIG. 7 is a perspective view of another embodiment of the optical coupling assembly of FIG. 1 according to an example embodiment.

FIG. 7 illustrates optical coupling assembly 310, another embodiment of optical coupling assembly 10. Optical coupling assembly 310 is similar to optical coupling assembly 210 in that optical coupling assembly 310 includes a multitude of transparent light transmitting members fusion bonded to one another. In the particular example illustrated, optical coupling assembly 310 is a lenticular array. Optical coupling assembly 310 includes transparent light transmitting members 312A, 312B and 312C (collectively referred to as members 312) fusion bonded to one another. Member 312A is a plate of transparent material, such as glass. Members 312B and 312C are elongate members having clinical surfaces fusion bonded to opposite sides of member 312A. In the example illustrated, members 312B are orthogonal to members 312C.

To enhance fusion bonding, bonding surface energy along interfaces 322 of members 312 is increased. According to one embodiment, the bonding surface energy of interfaces 322 of members 312 are increased by plasma treatment. In one embodiment, such plasma treatment may be carried out in a fashion similar to the method described above with respect to FIGS. 4B-4G. In other embodiments, the increasing of bond surface energy along interfaces 322 may be achieved in other fashions.

Figure 8:
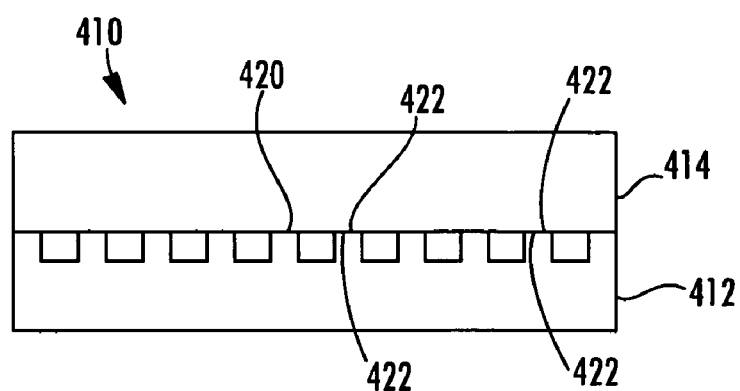
FIG. 8 is a side elevational view of another embodiment of the optical coupling assembly of FIG. 1 according to an example embodiment.

FIG. 8 schematically illustrates optical coupling assembly 410, another embodiment of optical coupling assembly 10. Optical coupling assembly 410 is a diffractive optics assembly. Optical coupling assembly 410 includes diffractive grating member 412 and waveguide member 414. Grating member 412 comprises an optical waveguide having periodic corrugations configured to provide refractive index modulation. Grating member 412 serves as a wavelength selective filter, reflecting a particular band of wavelengths while transmitting other wavelengths. In one embodiment, member 412 comprises a Bragg grating.

Waveguide member 414 comprises an optical transmitting waveguide fusion bonded to grating member 412. In the example illustrated, interfaces 422 of members 412 and 414 have bonding sites with increased or enhanced surface energy. According to one embodiment, the high surface energy of such bonding sites along interfaces 422 is achieved with plasma treatment. For example, interfaces 422 may be plasma treated enjoy to one another in a fashion similar to that described about with respect to optical coupling assembly 10 in FIGS. 4B-4G. In another embodiment, the bond surface energy along interfaces 422 may be increased in other fashions.

As with optical coupling assemblies 10, 210 and 310, optical coupling assembly 410 has light transmitting or reflecting members more robustly joined to one another in that the bonds between members 412 and 414 are less susceptible to degradation over time as a result of exposure to ultraviolet light or other light. In addition, optical coupling assembly 410 more efficiently transmits light because less light is leaked at the junction or seams 420 between members 412 and 414.

Although each of optical coupling assemblies 10, 210, 310 and 410 have been illustrated and described as having interfaces in which the bond surface energy has been increased to facilitate fusion bonding, and other embodiments, the interfaces of such members may alternatively be fusion bonded to one another without increase in the bonding site density along such interfaces. Although this may result in the use of higher annealing temperatures (greater than or equal to about 900° C.) for plasma bonded interfaces, the plasma bonding of such interfaces will still be less susceptible to degradation from prolonged exposure to wavelengths of light, such as ultraviolet light. In addition, because the plasma bonded interfaces joining the optical transmitting or reflecting members on an atomic level, light leakage may be reduced, enhancing light transmitting efficiency.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method for forming an optical coupling assembly, the method comprising:
   providing light reflecting or transmitting members having faces to be joined to one another, wherein the members comprise plates having a reflective coating;
   increasing bond surface energy of at least one of faces by at least one technique from the group consisting of plasma treatment, ion beam sputtering processes, reactive ion etching, striking of plasma onto the faces, ion implantation, and ion bombardment;
   joining the faces to fusion bond the faces to one another;
   cutting the fusion bonded plates into fusion bonded stacks of rods;
   applying a reflective coating to exterior faces of the stacks; and
   fusion bonding the faces of the stacks to one another.

2. The method of claim 1, wherein fusion bonding the faces of the stacks to one another comprises:
   plasma treating the faces of the stacks; and
   joining the stacks along the faces of the stacks to plasma bond the stacks to one another.

3. The method of claim 1 wherein each member has an interface to facilitate fusion bonding, the method further comprising:
   depositing a layer of bonding material on at least one of the interfaces; and
   fusion bonding the material to at least one of the interfaces.

4. The method of claim 1 further comprising annealing the members while joined along the faces at a temperature of less than or equal to about 200 degrees Celsius.

5. The method of claim 1 further comprising polishing the exterior faces of fusion bonded stacks.

6. The method of claim 1 wherein each member has an interface to facilitate fusion bonding, the method further comprising, after plasma treatment, dipping in deionized water or SC1 chemistry the interface to increase silanol group density on the interface.

* * * * *

UNITED STATES PATENT AND TRADEMARK OFFICE
CERTIFICATE OF CORRECTION

PATENT NO. : 7,376,303 B2  
APPLICATION NO. : 11/490388  
DATED : May 20, 2008  
INVENTOR(S) : Chien-Hua Chen et al.

Page 1 of 1

It is certified that error appears in the above-identified patent and that said Letters Patent is hereby corrected as shown below:

On the title page, item (75), under "Inventors", in column 1, line 2, delete "Tucson, AZ (US)" and insert -- Corvallis, OR (US) --, therefor.

Signed and Sealed this

Fourteenth Day of October, 2008

JON W. DUDAS  
*Director of the United States Patent and Trademark Office*